July 9, 1963  H. R. LEGATSKI  3,096,625
REFRIGERATION OF LIQUEFIED GASES
Filed Aug. 4, 1961
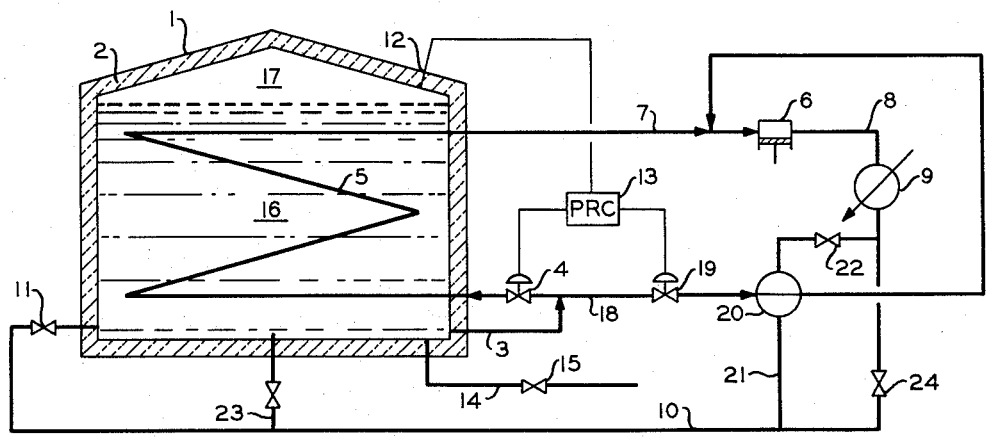
INVENTOR.
H. R. LEGATSKI
BY *Hudson & Young*
ATTORNEYS

United States Patent Office 3,096,625
Patented July 9, 1963

3,096,625
REFRIGERATION OF LIQUEFIED GASES
Harold R. Legatski, Bartlesville, Okla., assignor to Phillips Petroleum Company, a corporation of Delaware
Filed Aug. 4, 1961, Ser. No. 129,424
5 Claims. (Cl. 62—54)

This invention relates to the refrigeration of stored liquefied petroleum gases. In one aspect it relates to the refrigeration of stored commercial propane containing a minor percentage of ethane as an impurity.

When volatile liquids are stored they may be stored under sufficient pressure to maintain the materials in the liquid state. Also, if it is desired to store the liquids at atmospheric pressure then the liquids must be refrigerated in order to maintain their vapor pressure at a value of at least atmospheric pressure. In many cases such volatile liquids are stored in the liquid state at a pressure greater than atmospheric pressure but less than the vapor pressure of the liquid at atmospheric temperature. Under this latter condition a certain degree of refrigeration is required. This refrigeration maintains the liquid at a temperature corresponding to the desired storage pressure, that is, it maintains the liquid at a temperature at which the vapor pressure of the liquid is the desired storage pressure.

In order to maintain the stored liquid at sub-atmospheric temperatures prior art teaches withdrawal of vapor from the vapor space of the storage tank, compressing this vapor to a pressure at which it can be condensed to liquid. The liquid is then returned to the storage tank. Upon continued withdrawal of vapor, compressing the vapor and condensing the compressed vapor and returning the condensate to the tank, evaporation of the liquid in the tank with its subsequent cooling to the desired stored temperature occurs.

When such prior art refrigeration methods are employed to refrigerate liquefied gases of ordinary commercial purity I have discovered a method for refrigerating such a commercial liquid requiring less power for compression and accordingly at less cost than the above-mentioned prior art method.

According to my invention, I remove or withdraw a stream of liquid from the tank, I reduce the pressure of this withdrawn liquid to vaporize at least a portion of the same and I pass this at least partially vaporized liquid through a heat exchange coil in the normally liquid containing portion of the tank. The refrigeration produced by this vaporizing liquid cools the remaining liquid in the tank to its proper storage temperature. The fluid in the heat exchange coil is withdrawn therefrom by a compressor and compressed to such a pressure that the compressed vapor can be condensed by ordinary plant cooling water. The condensate is then returned to the storage tank.

Commercial propane usually contains several percent of ethane. In the storage of liquefied propane containing about five percent ethane the vapor above the liyuid in the storage tank at 20° Fahrenheit and under a pressure of about 62 p.s.i.a. (pounds per square inch absolute) contains about 18½ percent ethane. This 18½ percent ethane in the vapor phase above the liquid is in contrast to the five percent ethane in the liquid phase in the tank, when the vapor phase and the liquid phase are in equilibrium. In the prior art process of refrigerating such a system this high ethane content vapor is withdrawn from the tank, compressed, condensed and returned to the tank. As will be realized, compressing such vapors containing 18½ percent ethane must be at a higher pressure in order to condense the compressed vapors for the production of condensate than the pressure required to compress vaporized liquid containing only five percent ethane from an indirect heat exchange coil. Thus, according to this invention, I provide a saving in the power requirements for refrigerating such a material as commercial quality propane by using the liquid phase in the tank for the refrigeration in place of the vapor normally above the liquid.

An object of this invention is to provide apparatus and a method for refrigerating stored liquefied gases of commercial purity. Another object of this invention is to provide apparatus and a method for the refrigeration of stored propane of commercial purity. Still other objects and advantages of this invention will be realized upon reading the following description which, taken with the attached drawing, forms a part of this specification.

The drawing illustrates, in diagrammatic form, an arrangement of apparatus parts for carrying out the process of this invention.

In the drawing tank 1 is provided with an insulation covering 2 for the storage of such material as liquefied propane of commercial purity. The liquid phase is identified in the tank by reference numeral 16 while reference numeral 17 identifies the vapor phase. In such a case as the storage of liquefied propane of commercial purity such a liquid may in some cases contain about five percent by volume of ethane. When storing this propane containing five percent ethane at about 20° F. the tank contents are at a pressure of approximately 62 p.s.i.a. At this temperature and pressure the vapor above the liquid contains about 18½ percent ethane and about 81½ percent propane. A conduit 3 is provided near the bottom of the tank for removal of liquid propane which in one embodiment is passed through a pressure reducing throttle valve 4 into a heat exchange coil 5. The outlet end of coil 5 is connected with a conduit 7 which leads vapor from the coil to the suction side of a compressor 6. Compressed vapor is passed through a conduit 8 to a condenser 9 and condensate therefrom is passed on through a conduit 10 provided with a valve 11 into the liquid 16 in the tank. The tank is provided with a pressure sensing means 12 such as a Bourdon tube or any suitable available pressure sensing device. This pressure sensing device 12 communicates with a pressure controller 13 which in turn emits a signal responsive to the pressure as sensed by pressure sensing means 12 for actuation of the motor valve 4. Thus if it is desired to maintain a pressure within the tank at the above mentioned 62 p.s.i.a. then as pressure in the tank increases to a value slightly above 62 p.s.i.a. the pressure controller senses this increase in pressure and actuates valve 4 to open same for admission of a larger stream of liquid from conduit 3 into heat exchange coil 5. By the admission of a larger flow of liquid into coil 5 sufficient refrigeration is provided for cooling the stored liquid to such a temperature that the pressure in the tank is reduced to its desired value. The vapors produced in heat exchanger 5 are withdrawn through the conduit 7, compressed in compressor 6 and the compressed vapor is condensed in condenser 9. The compressor outlet pressure required so that plant cooling water in condenser 9 will condense the compressed vapors is about 181 p.s.i.a. when the vapors contain about five percent ethane. The condensate emerging from condenser 9 at this pressure of 181 p.s.i.a. and at a temperature of approximately 90° F. is passed on through conduit 10 through a pressure reducing valve 11 into the tank 1. Upon passing through the pressure reducing valve 11 this warm liquid may flash with the production of some vapor. Thus a mixture of liquid and vapors is ordinarily introduced into the tank 1 and such an inlet fluid assists in stirring the contents of the tank for maintenance of equal temperature throughout the liquid containing section. If desired, valve 11 ca be closed and a valve in the branch conduit 23 can be opened for admission of this relatively warm condensate from conduit 10 through the bottom of the tank into the area in which coil 5 is positioned. Thus, in this case, the flashing of the condensate upon entering the tank causes an upflow of liquid with its circulation in the immediate vicinity of the heat exchange coil 5 thus providing circulation of the liquid contents of the tank with the result that a relatively uniform temperature is maintained throughout the liquid in the tank.

As an alternative procedure if it is desired to add only liquid condensate to the tank at at least tank temperature, additional liquid from the tank is withdrawn through conduit 3 and this additional liquid is passed through a bypass conduit 18, through a motor valve 19 for expansion of the liquid with its subsequent chilling effect. This pressure reduced liquid passes through an indirect heat exchanger 20 for chilling all or a portion of the condensate issuing from condenser 9. If it is desired to chill in this manner all of the condensate issuing from condenser 9 valve 24 is closed and a valve 22 in the bypass conduit 21 is opened so that all condensate flows through heat exchanger 20. This motor valve 19 can if desired be operated by the pressure controller 13 in response to the pressure in the tank as was explained hereinabove relative to the operation of motor valve 4. Also, if desired, by manipulation of valves 22 and 24 any desired portion or fraction of this stream of condensate can be chilled in this manner.

Conduit 14 containing valve 15 is provided for inlet and outlet of liquid to and from storage.

By the prior art removal of vapor from the vapor space of the tank, compressing this vapor, condensing this compressed vapor containing about 18½ percent ethane in propane to such a pressure (about 267 p.s.i.a.) that the compressed vapor can be condensed at a condenser temperature of 90° F. requires 4.9 boiler horsepower of work to remove each million B.t.u. from the tank per 24 hours. By the use of this invention wherein liquid in the tank containing only 5 percent ethane is expanded in coil 5 then by removing vapors from the coil, compressing same to about 181 p.s.i.a. in order to produce condensate at 90° F. requires only 3.9 boiler horsepower of work to remove each million B.t.u. from the tank per 24 hours. 4.9/3.9×100=125. Thus the prior art method requires 25 percent more horsepower for the production of the same amount of refrigeration in the tank than by the method of this invention.

Liquid according to this invention is withdrawn through conduit 3 at a pressure of the above-mentioned 62 p.s.i.a. and upon passing through motor valve 4 the pressure is reduced to about 51 p.s.i.a. and the temperature of the vapor in the tubes of coil 5 is approximately 15° F. Thus compressor 6 withdraws vapor from coil 5 at a pressure of about 51 p.s.i.a. and compresses these vapors to a pressure of about 181 p.s.i.a. Compressor 6 has thus increased the pressure of the withdrawn vapors by 130 p.s.i.a. In the prior art in which vapors from the top of the tank are removed at the above-mentioned 62 p.s.i.a. and compressed to 267 p.s.i.a. the compressor is required to compress the gases by an increase of 205 p.s.i.a. Thus, accordingly the compressor in the prior art case is required to increase the pressure by 205 pounds in contrast to a pressure increase of 130 pounds by the present invention.

Motor valves 4 and 19 are preferably throttle valves so that the valves can be opened a little as pressure requirements dictate and also so that they may be throttled somewhat as pressure in the tank is reduced. Furthermore, if desired, pressure controller 13 can be a pressure recording controller so that a permanent record of the pressure maintained in the tank is produced.

While this invention has been described relative to the storage of liquid propane containing a small percentage of ethane as an impurity, the invention is applicable to the storage of other volatile commercial liquids such as liquid butane containing minor amounts of liquid propane.

While, as an example, I have described hereinabove a single coil 5 as the heat exchange coil in tank 1, I do not wish to be limited in this respect because other suitable types of heat transfer apparatus can be employed. For example, I can use a liquid refrigerant inlet header near the tank bottom, a vapor outlet header near the level of liquid in the tank when liquid full, these headers being connected by a plurality of heat exchange tubes.

The heat exchange apparatus of this invention can also be operated by maintaining a predetermined liquid level of refrigerant in the heat exchange tubes and headers and varying the suction pressure of the compressor in accordance with the pressure of the vapor in the tank.

While certain embodiments of the invention have been described for illustrative purposes, the invention obviously is not limited thereto.

I claim:

1. A process for pressure control in a zone containing a liquid comprising propane and a minor proportion of ethane comprising the steps of withdrawing liquid from said zone, reducing the pressure of the withdrawn liquid whereby at least a portion of the liquid of reduced pressure vaporizes, passing the so produced vapors and unvaporized liquid into indirect heat exchange with liquid in said zone whereby the unvaporized liquid vaporizes, withdrawing the vapors from the heat exchange step, compressing the withdrawn vapors, condensing the compressed vapors, withdrawing further liquid from said zone, reducing the pressure on this further withdrawn liquid and passing same in indirect heat exchange with the condensate whereby the condensate is chilled and the pressure reduced further withdrawn liquid is vaporized, introducing these latter formed vapors into the compressing step, and returning the chilled condensate into said zone, regulating the rate of withdrawal of the first withdrawn liquid from said zone in response to pressure therein whereby upon increase of pressure in said zone said rate of withdrawal is increased thereby increasing the indirect heat exchange effect and achieving said pressure maintenance.

2. A process for the refrigeration of a liquid comprising a liquefied first normally gaseous material containing a second normally gaseous material having a normal boiling point below the normal boiling point of the first material comprising withdrawing a stream of said liquid from a zone containing said liquid, reducing the pressure of the withdrawn liquid whereby at least a portion of the reduced pressure liquid vaporizes, passing the so produced vapor and any unvaporized liquid into indirect heat exchange with liquid remaining in said zone wherein said unvaporized liquid vaporizes, withdrawing vapors from the heat exchange step, compressing the withdrawn vapors, condensing the compressed vapors thereby producing condensate, withdrawing further liquid from said zone, reducing pressure on this further withdrawn liquid and passing same in indirect heat exchange with said condensate whereby said condensate is chilled and the pressure reduced further withdrawn liquid is vaporized, introducing these latter formed vapors into said compressing step and introducing the chilled condensate into said zone.

3. A process for pressure control in a zone containing a liquid comprising propane and a minor proportion of ethane comprising the steps of withdrawing a stream of said liquid from said zone, reducing the pressure of the withdrawn liquid whereby at least a portion of the reduced pressure liquid vaporizes, passing the so produced vapors and any unvaporized liquid into indirect heat exchange with liquid remaining in said zone wherein said unvaporized liquid vaporizes, withdrawing the vapors from the heat exchange step, compressing the withdrawn vapors, condensing the compressed vapors thereby producing condensate, withdrawing further liquid from said zone, reducing pressure on this further withdrawn liquid and passing same in indirect heat exchange with said condensate whereby said condensate is chilled and the pressure reduced further withdrawn liquid is vaporized, compressing the latter producing vapors and condensing these latter compressed vapors thereby producing condensate, and introducing both condensates into said zone.

4. An apparatus comprising in operable combination, a vessel for storage of a liquefied gas, a heat exchange coil in said vessel, a first conduit communicating the interior of said vessel with one end of said coil, a portion of said first conduit being exterior of said vessel and said portion having a throttle type motor valve therein, a compressor having an inlet for material to be compressed and an outlet, a second conduit communicating the other end of said coil with the inlet of said compressor, a condenser having an inlet and an outlet for material to be condensed, a third conduit communicating the outlet of said compressor with the inlet of said condenser, a fourth conduit communicating the outlet of said condenser with the interior of said vessel, a fifth conduit also communicating the outlet of said condenser with the interior of said vessel, a portion of said fifth conduit being separate from said fourth conduit, an indirect heat exchanger in the separate portion of said fifth conduit, a sixth conduit having a second motor valve and being in communication with the first mentioned valve and the point of communication of said first conduit with said vessel and with an inlet of said heat exchanger, said heat exchanger having an outlet in communication with its inlet, a pressure sensing means positioned to sense pressure in said vessel, a pressure controller in operative communication with said pressure sensing means and with the motors of the valves whereby said controller actuates the motors of said valves to open same in response to an increase in pressure above a predetermined pressure in said vessel as sensed by said pressure sensing means.

5. An apparatus comprising, in operable combination, a vessel for storage of a liquefied gas, a heat exchange coil in said vessel, a first conduit communicating the interior of said vessel with one end of said coil, a portion of said first conduit being exterior of said vessel and said portion having a throttle type motor valve therein, a compressor having an inlet for material to be compressed and an outlet, a second conduit communicating the other end of said coil with the inlet of said compressor, a condenser having an inlet and an outlet for material to be condensed, a third conduit communicating the outlet of said compressor with the inlet of said condenser, a fourth conduit communicating the outlet of said condenser with the interior of said vessel, a fifth conduit also communicating the outlet of said condenser with the interior of said vessel, a portion of said fifth conduit being separate from said fourth conduit, an indirect heat exchanger in the separate portion of said fifth conduit, a sixth conduit having a second motor valve and being in communication with said first conduit intermediate said first valve and the point of communication of said first conduit with said vessel and with an inlet of said heat exchanger, said heat exchanger having an outlet in communication with its inlet, a seventh conduit communicating the outlet of said heat exchanger with said second conduit, a pressure sensing means positioned to sense pressure in said vessel, a pressure controller in operative communication with said pressure sensing means and with the motors of the valves whereby said controller actuates the motors of said valves to open same in response to an increase in pressure above a predetermined pressure in said vessel as sensed by said pressure sensing means.

References Cited in the file of this patent
UNITED STATES PATENTS

| | | |
|---|---|---|
| 2,033,094 | De Motte | Mar. 3, 1936 |
| 2,082,189 | Twomey | June 1, 1937 |
| 2,489,514 | Benz | Nov. 29, 1949 |
| 2,550,886 | Thompson | May 1, 1951 |
| 2,959,928 | Maker | Nov. 15, 1960 |

References Cited in the file of this patent
UNITED STATES PATENTS

| | | |
|---|---|---|
| 668,512 | France | July 15, 1929 |